(12) United States Patent
Roman

(10) Patent No.: US 6,567,547 B1
(45) Date of Patent: May 20, 2003

(54) SYSTEM AND METHOD FOR DYNAMICALLY SWITCHING OCR PACKAGES

(75) Inventor: Edgar M Roman, Fort Collins, CO (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/263,190

(22) Filed: Mar. 5, 1999

(51) Int. Cl.$^7$ ................................................. G06K 9/00
(52) U.S. Cl. ....................................................... 382/181
(58) Field of Search ........................... 235/454; 358/474; 382/181, 224, 229, 309, 311–312, 321–324

(56) References Cited

U.S. PATENT DOCUMENTS

| | | | |
|---|---|---|---|
| 5,101,436 A | * 3/1992 | DeAguiar et al. | 382/241 |
| 5,212,739 A | 5/1993 | Johnson | 382/9 |
| 5,237,627 A | 8/1993 | Johnson et al. | 382/30 |
| 5,727,082 A | * 3/1998 | Sugishima | 382/229 |
| 5,836,872 A | * 11/1998 | Kenet et al. | 382/128 |

FOREIGN PATENT DOCUMENTS

| | | | |
|---|---|---|---|
| EP | 0307111 AZ | 8/1988 | G06K/9/68 |
| EP | 0555023 A2 | 1/1993 | G06K/9/68 |

OTHER PUBLICATIONS

S. G. Kleinmann: "Customizing your installation of Debian GNU/Linux" The Debian GNU/Linux FAQ, 'Online!–19 Feb. 1999; Internet; http://web/archive.org/web/19990219173126/www.debian.org/doc/FAQ/debian–faq–12.html.

Dattilo, A. J., et al., "Scanner Loading of Recognition Programs for OCR Devices, Feb. 1979.". IBM Technical Disclosure Bulletin, vol. 21, no. 9, Feb. 1, 1979, p. 3549, New York.

Ciardiello, G., et al.: "An Experimental System for Office Document Handling and Text Recognition" Proceedings of the International Conference on Pattern Recognition., Rome, 14–17 Nov., 1988, IEEE Comp. Soc. Press, vol. 2, Conf. 9, Nov. 14, 1988, pp. 739–743.

Spitz, A.L., et al. "Palace: A Multilingual Document Recognition System" International Association for Pattern Recognition Workshop on Document Analysis Systems, 1994, pp. 16–37.

Tan, T.N. "Written Language Recogniation Based on Texture Analysis" Proceedings of the International Conference on Image Processing (ICIP) Lausanne, Sep. 16–19, 1996, New York, IEEE, vol. 1, Sep. 16, 1996, pp. 185–188.

* cited by examiner

*Primary Examiner*—Timothy M. Johnson

(57) ABSTRACT

An optical character recognition (OCR) scanning system utilizes a memory device, a registry, a scanning application, a processor, and a scanning device to scan the text of documents into memory. The scanning device is configured to capture an image of a document in response to a scan command from the scanning application. The scanning application locally stores a set of current parameter values indicating the location in the memory device of the OCR package that should be used to currently analyze and interpret images produced by the scanning device. If the scanning application receives a message to update the current parameter values, the scanning application retrieves new parameter values from the registry and stores these values in the memory device as the current parameter values. If the scanning application receives a message to initiate a document scan, the scanning application transmits the scan command to the scanning device and retrieves the current parameter values from the memory device. The processor uses these retrieved parameter values to locate code defining an OCR package. Once the OCR package is located, the processor executes the OCR package to analyze and interpret the image produced by the scanning device.

12 Claims, 6 Drawing Sheets

SYSTEM AND METHOD FOR DYNAMICALLY SWITCHING OCR PACKAGES

BACKGROUND OF THE INVENTION

1. Field of the Invention

The present invention generally relates to computer systems and, in particular, to a system and method for dynamically changing which optical character recognition (OCR) package is used to analyze an image captured by an optical scanner.

2. Related Art

Optical character recognition (OCR) scanning systems create electronic or software copies of textual documents. In this regard, each OCR scanning system includes a scanning device that captures an image of a document. Software, referred to as an "OCR package, " associated with the scanning system is then executed to analyze the captured image in order to interpret the text of the scanned document. Once the text is determined by the OCR package, a software copy of the text is created which can be stored and manipulated according to conventional processing techniques. U.S. Pat. No. 5,212,739 entitled, "Noise Tolerant Optical Character Recognition System, " which is incorporated herein by reference, describes an OCR system capable of analyzing a scanned image to create a software copy of the text included within the scanned image.

In order to improve performance of the scanning system, it is desirable for the OCR package to be specifically tailored to the language of the scanned document. For example, the characters and words used by different languages (e.g., English, French, Spanish, etc.) are often different. Therefore, to achieve the best results, one OCR package specifically tailored for English should be used to interpret the image of an English document, and another OCR specifically tailored for French should be used to interpret the image of a French document.

Unfortunately, most OCR scanning systems do not provide the capability of dynamically switching which OCR packages are used to analyze and interpret the documents scanned by the OCR scanning system. In this regard, most conventional OCR scanning systems are initialized to use a particular OCR package. Some systems allow the user to select a particular OCR package at initialization while other systems are automatically initialized to use a default OCR package. The system utilizes the OCR package selected during initialization to analyze and interpret each document scanned by the system. If the user wishes to utilize a different OCR package after initialization, the user is usually required to reinstall the scanning application along with the different OCR package so that the system may be initialized to use the different OCR package.

As a result, significant delays are experienced when the user needs to scan a document with an OCR scanning system that has not been initialized to use the proper OCR package for analyzing the document. Thus, a heretofore unaddressed need exists in the industry for providing a system and method for efficiently switching the OCR package used to analyze and interpret the text of a scanned document.

SUMMARY OF THE INVENTION

The present invention overcomes the inadequacies and deficiencies of the prior art as discussed hereinbefore. In general, the present invention provides a system and method for dynamically switching OCR packages used to analyze and interpret the text of scanned documents.

The present invention utilizes a memory device, a registry, a scanning application, a processor, and a scanning device. The scanning device is configured to capture an image of a document in response to a scan command from the scanning application. The scanning application locally stores a set of current parameter values indicating the location in the memory device of the OCR package that should be used to currently analyze and interpret images produced by the scanning device. If the scanning application receives a message to update the current parameter values, the scanning application retrieves new parameter values from the registry and stores these values in the memory device as the current parameter values. If the scanning application receives a message to initiate a document scan, the scanning application transmits the scan command to the scanning device and retrieves the current parameter values from the memory device. The processor uses these retrieved parameter values to locate code defining an OCR package. Once the OCR package is located, the processor executes the OCR package to analyze and interpret the image produced by the scanning device.

In accordance with another feature of the present invention, an OCR utility is configured to interface with a user to determine when the user would like to select a new OCR package. When the user would like to select a new OCR package, the OCR utility updates the registry then transmits an update notification to the scanning application.

The present invention can also be viewed as providing an OCR method for electronically scanning text of documents into memory. Briefly described, the method can be broadly conceptualized by the following steps: providing a scanning device; providing a plurality of OCR packages to analyze images captured by the scanning device; capturing an image of a document via the scanning device; enabling a user to dynamically select one of the OCR packages to analyze the image captured by the scanning device; indicating which of a plurality of OCR packages is selected by the user to analyze the image; and analyzing the image with the OCR package that is indicated as being selected by the user in the indicating step.

The present invention has many advantages, a few of which are delineated hereafter, as mere examples.

An advantage of the present invention is that the OCR packages used to analyze and interpret the text of a scanned image may be quickly and easily switched.

Another advantage of the present invention is that the efficiency of an OCR scanning system can be increased.

Another advantage of the present invention is that documents written in different languages can be scanned by the same OCR scanning system.

Other features and advantages of the present invention will become apparent to one skilled in the art upon examination of the following detailed description, when read in conjunction with the accompanying drawings. It is intended that all such features and advantages be included herein within the scope of the present invention, as is defined by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

Figure 1:
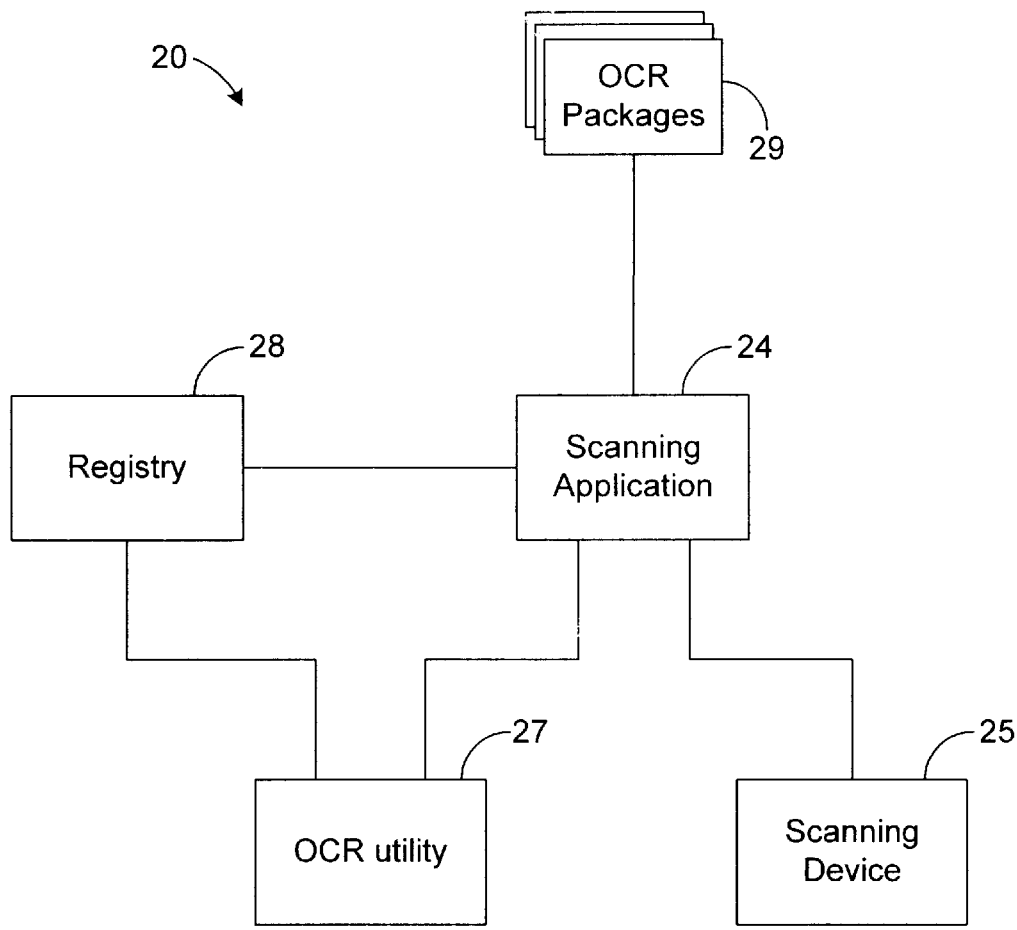
FIG. 1 is a block diagram illustrating an OCR scanning system in accordance with the present invention.

FIG. 1 depicts an optical character recognition (OCR) scanning system 20 in accordance with the present invention. As shown by FIG. 1, the system 20 includes a scanning application 24, a scanning device 25, an OCR utility 27, a registry 28, and a plurality of OCR packages 29. The scanning device 25 is designed to capture an image of a document, and the OCR packages 29 are configured to analyze and interpret the text of the captured image. The registry 28 indicates which of the OCR packages 29 should be used to currently analyze and interpret the images of scanned documents. The scanning application 24 is configured to control the process of scanning and interpreting the text of a document, and the OCR utility 27 is configured to control the process of switching which OCR package 29 is utilized to interpret the scanned documents.

The scanning application 24, the OCR utility 27, and the OCR packages 29 can be implemented in software, hardware, or a combination thereof. In the preferred embodiment, as illustrated by way of example in FIG. 2, the scanning application 24, the OCR utility 27 and the OCR packages 29 of the present invention along with their associated methodology are implemented in software and stored in computer memory 31 of a computer system 30.

Note that the scanning application 24, the OCR utility 27, and the OCR packages 29, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the scanning application 24, the OCR utility 27, and the OCR packages 29 may be magnetically stored and transported on a conventional portable computer diskette(s).

Figure 2:
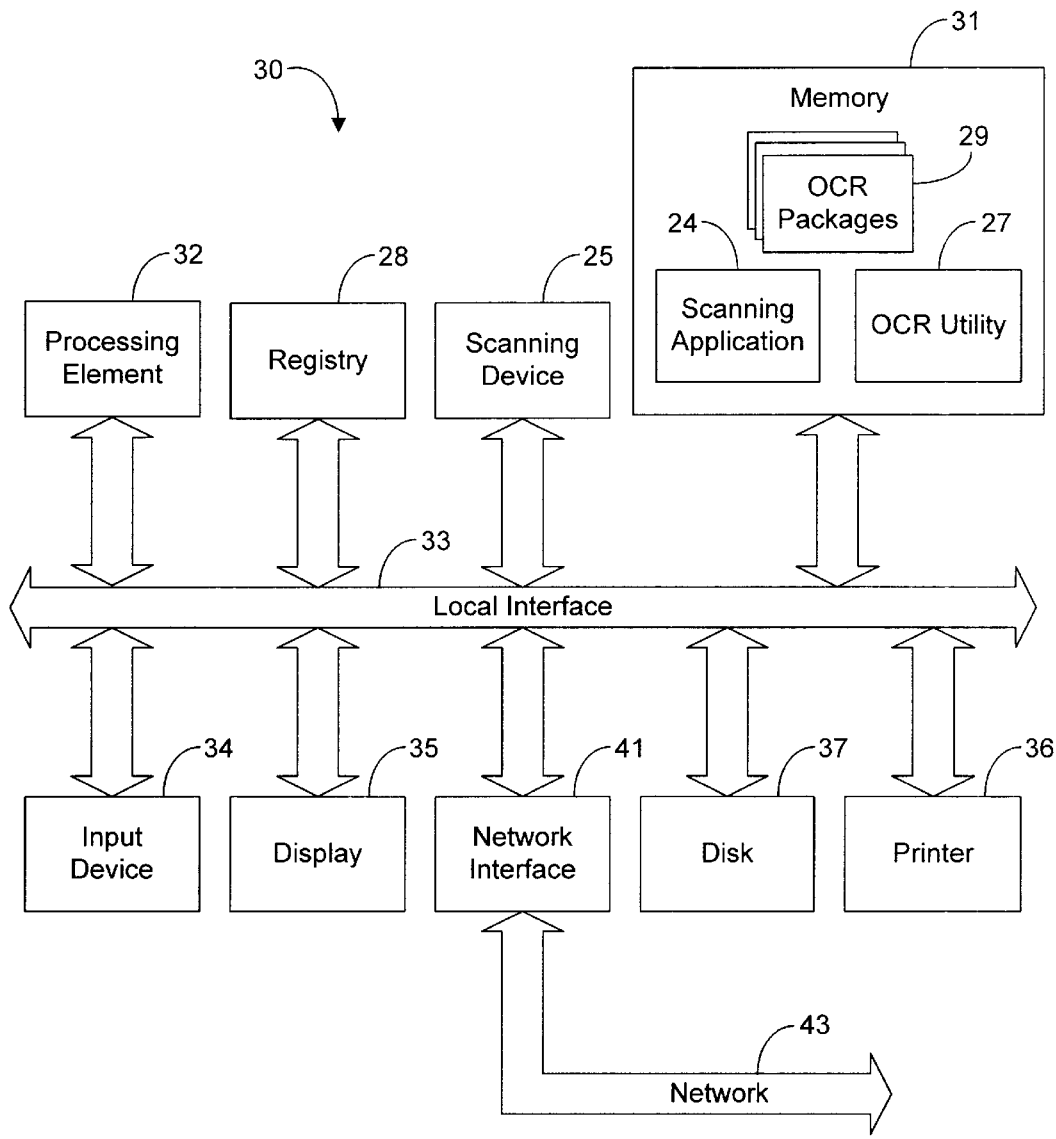
FIG. 2 is a block diagram illustrating a computer system employing the OCR scanning system of FIG. 1.

The preferred embodiment of the computer system 30 of FIG. 2 comprises one or more conventional processing elements 32, such as a digital signal processor (DSP), that communicate to and drive the other elements within the system 30 via a local interface 33, which can include one or more buses. Furthermore, an input device 34, for example, a keyboard or a mouse, can be used to input data from a user of the system 30, and screen display 35 or a printer 36 can be used to output data to the user. A disk storage mechanism 37 can be connected to the local interface 33 to transfer data to and from a nonvolatile disk(s) (e.g., magnetic, optical, etc.). In addition, the local interface 33 can be connected to a registry 28 that, as known in the art, includes information regarding operation of the computer system 30. The system 30 can be connected to a network interface 41 that allows the system 30 to exchange data with a network 43. Furthermore, system 30 can be connected to scanning device 25, which is a well known device configured to capture an electronic image of a document.

Figure 3:
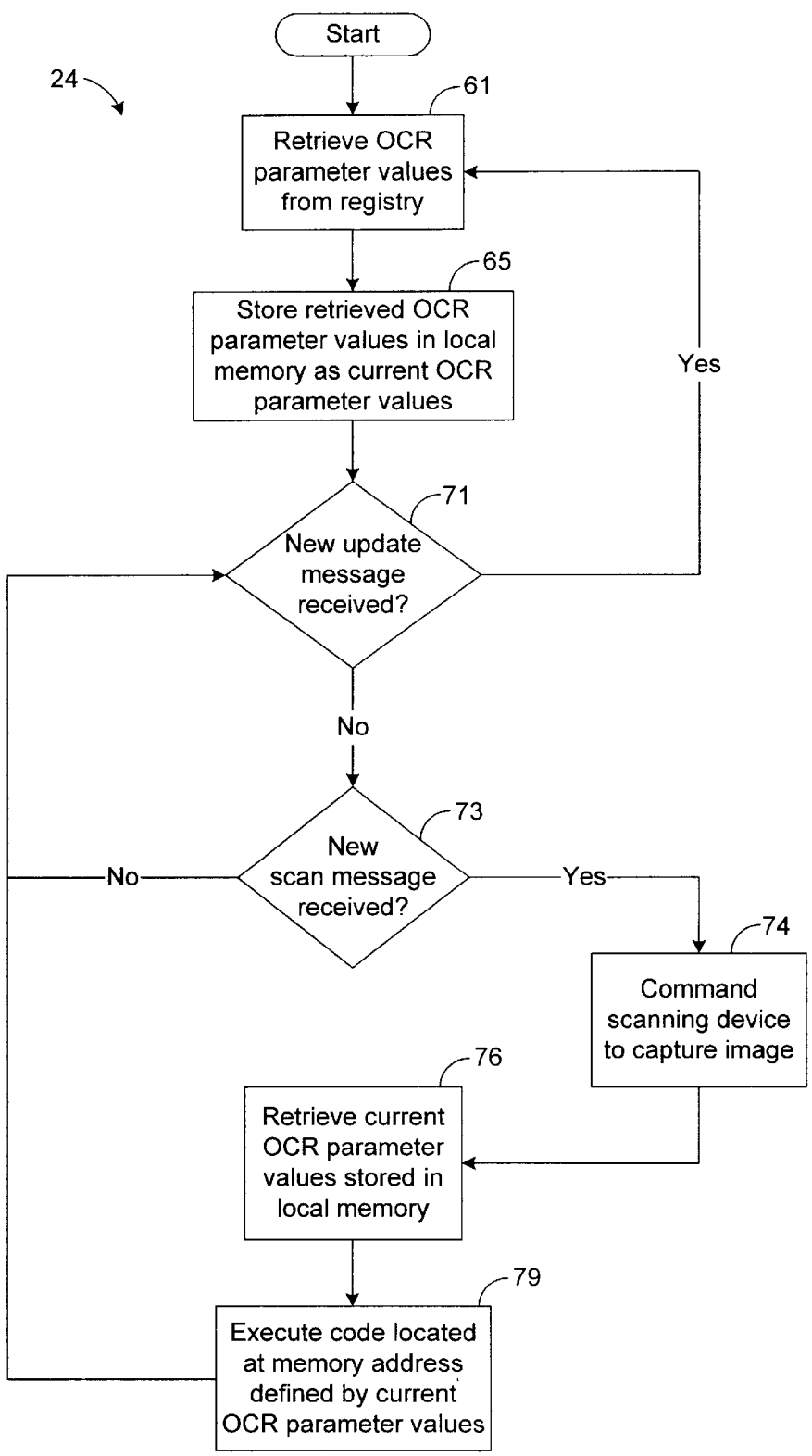
FIG. 3 is a flow chart illustrating the architecture and functionality of the scanning application of FIG. 1.

FIG. 3 depicts the architecture and functionality of the scanning application 24. As shown by block 61 of FIG. 3, the scanning application 24 is configured to retrieve OCR parameter values from registry 28 during initialization of the scanning application 24. The retrieved OCR parameter values indicate the location in memory of a particular OCR package 29. As known in the art, each OCR package 29 is configured to analyze an image captured by the scanning device 25 in order to interpret the text included in the image. As described hereinbefore in the Background section, each OCR package 29 is usually tailored to a particular language, such as English, Spanish or French, for example, and therefore is configured differently than other OCR packages 29.

The registry 28 is designed to indicate which set of OCR parameter values is current via utilization of a pointer or some other suitable structure and/or technique. The selection of the current OCR parameter values will be discussed in further detail hereinafter. When the scanning application 24 retrieves OCR parameter values from the registry 28, the scanning application 24 is configured to determine which set of OCR parameter values is indicated as current by the registry 28 and to retrieve the current OCR parameter values.

After retrieving the current OCR parameter values from registry 28, the scanning application 24 is designed to store the current OCR parameter values in memory 31, as shown by block 65 of FIG. 3. Then, the scanning application 24 is designed to wait for a notification to either initiate a document scan or to update the OCR package 29 used to scan documents, as shown by blocks 71 and 73 of FIG. 3.

If a notification to update the OCR package 29 is received or detected, then the scanning application 24 is designed to update the current OCR parameter values stored in memory 31 by repeating blocks 61 and 65, as shown by FIG. 3. Therefore, the scanning application 24 is designed to retrieve new OCR parameter values and to store these new OCR parameter values in memory 31 in response to the notification to update the OCR parameter values. The new OCR parameter values correspond to the OCR parameter values indicated as current by the registry 28 when the scanning application 24 retrieves the new OCR parameter values.

However, if a notification to initiate a document scan is received or detected, then the scanning application 24 is designed to instruct the scanning device 25 to capture an image, as shown by block 74. Once the image is captured, the scanning application 24, as shown by block 76, is designed to retrieve the OCR parameter values that were most recently stored in memory 31 in block 65 (i.e., the current OCR parameter values). The OCR package 29 at the location in memory 31 defined by the current OCR parameter values retrieved in block 76 is then executed to interpret and define the text included in the captured image, as depicted by block 79. Thereafter, the data produced by the execution of the OCR package 29 (i.e., the data defining the text of the captured image) can be stored and manipulated as desired according to techniques well known in the art.

Figure 4:
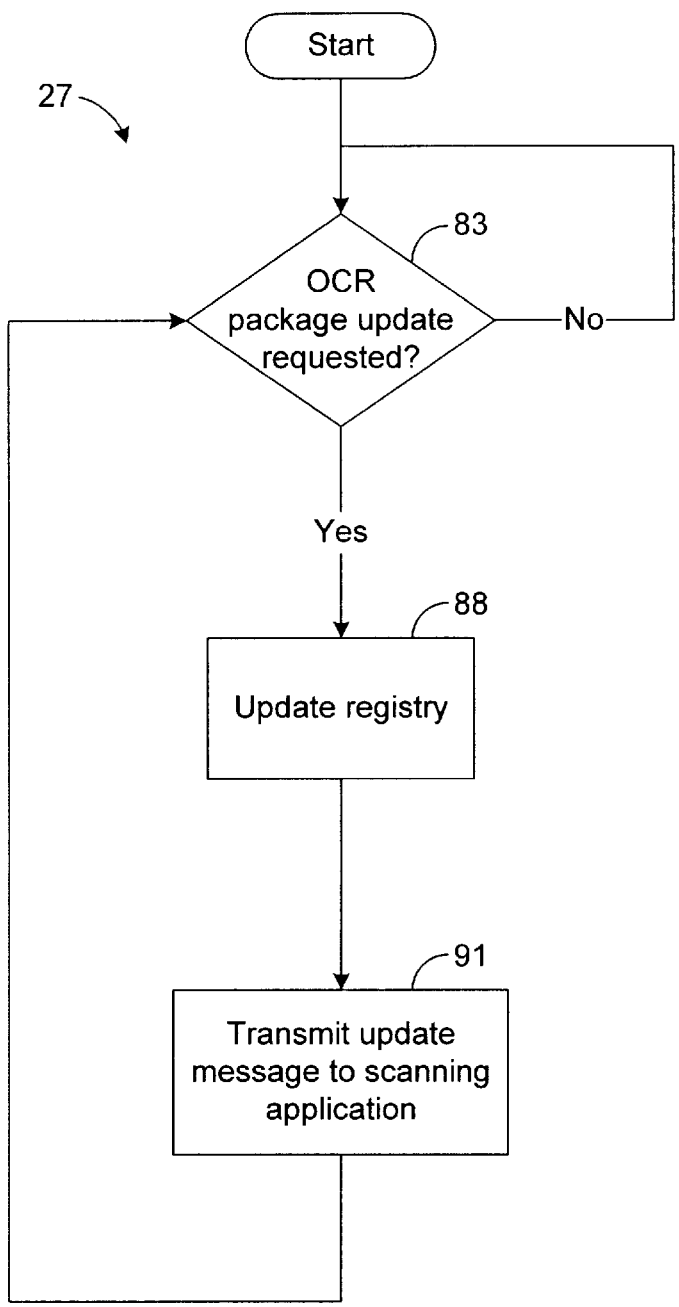
FIG. 4 is a flow chart illustrating the architecture and functionality of the OCR utility of FIG. 1.

The architecture and functionality of the OCR utility 27 is shown by FIG. 4. As shown by blocks 83 and 85, the OCR utility 27, through techniques known in the art, is designed to utilize user interfaces (e.g., input device 34 and display 35) to determine whether a user wishes to select a new OCR package 29.

If the OCR utility 27 determines that the user wishes to select a new OCR package 29, then the OCR utility 27 is first designed to update the registry 28, as shown by block 88. In this regard, the OCR utility 27 is designed to change which set of OCR parameter values are indicated as current by the registry 28 so that the OCR parameter values corresponding with the OCR package 29 (i.e., defining the location in memory of the OCR package 29) currently selected by the user are indicated by the registry 28 as current. Then, as depicted by block 91, the OCR utility 27 is configured to transmit a notification to the scanning application 24 to notify the scanning application 24 of the selection of the new OCR package 29. In response, the scanning application 24 updates the current OCR parameter values stored in memory 31, as described hereinabove.

OPERATION

The preferred use and operation of the system 20 and associated methodology are described hereafter.

Figure 5:
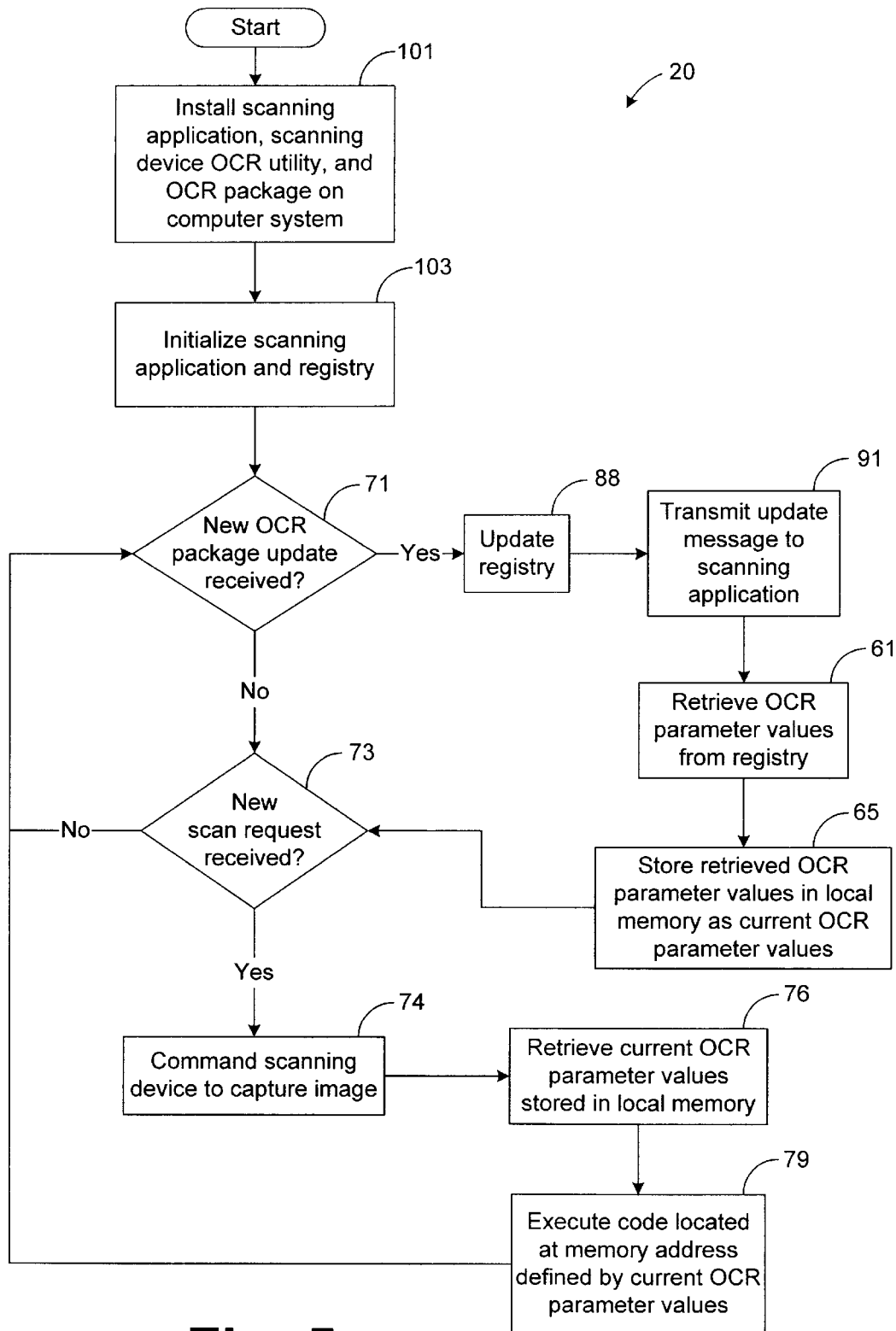
FIG. 5 is a flow chart illustrating the process implemented by the system depicted in FIG. 1.

Referring to FIG. 5, scanning device 25, scanning application 24, and OCR utility 27 are initially installed on the computer system 30, as shown by block 101. Furthermore, at least one OCR package 29 is installed in block 101, although it is possible to install the OCR package(s) 29 at other times. To install the scanning application 24, OCR utility 27, and OCR package 29, code defining the scanning application 24, OCR utility 27, and OCR package 29 is stored in memory 31. In this regard, the code can be read from a disk(s) located in the disk storage device 37, through techniques known in the art.

Figure 6:
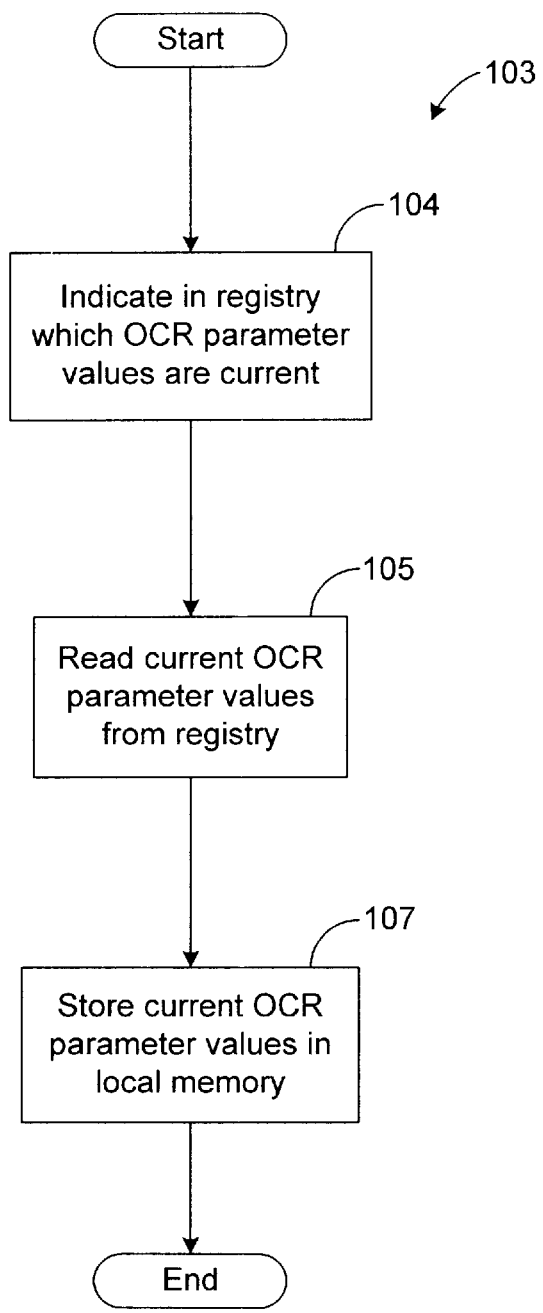
FIG. 6 is a flow chart illustrating the initialization of the scanning application and the registry depicted in FIG. 1.

Next, the scanning application 24 and registry 28 are initialized, as shown by block 103. As known in the art, the registry 28 includes information pertaining to the operation of the system 30. This information includes the OCR parameter values (i.e., values indicating the location in memory 31 of an OCR package 29) associated with each OCR package 29 installed on the system 30. The registry 28 is initialized by indicating which set of OCR parameter values is current, as depicted by block 104 (FIG. 6). For example, a pointer can be defined that points to the OCR parameter values that are selected as current. The current OCR parameter values can be selected during initialization based on default standards or on inputs received from the user. As will be discussed in further detail hereinafter, the OCR parameter values indicated by the registry 28 as current can be changed, as desired. Once the registry 28 is initialized, the scanning application 24 is initialized by reading the current OCR parameter values from the registry 28 and storing these values in memory 31, as shown by block 105 and 107 (FIG. 6).

After initialization, a user may specify via input device 34 to initiate a document scan. For example, assume that the current OCR parameter values selected during initialization define the location of an English OCR package 29 and that the user wishes to scan an English document. Since the current OCR parameter values correspond to an English OCR package 29, the current OCR parameter values do not need to be updated before the user requests a document scan. Therefore, the user enters a request via input device 34 to scan the document, and the input device 34 transmits a scan message to the scanning application 24 indicating that a document is ready to be scanned.

In response, the scanning application 24 instructs the scanning device 25 to capture an image of the document, as shown by blocks 73 and 74. Then, in block 76, the scanning application 24 retrieves the current OCR parameter values stored in memory 31. These values indicate the location in memory 31 of the currently selected OCR package 29 (i.e., the English OCR package 29 in this example) and are used in block 79 by the processing element 32 (FIG. 2) to execute the code defined by the data located at this location. During execution, the OCR package 29 interprets the text of the scanned document by analyzing an image of the document through techniques known in the art. Once the text is interpreted and defined in data, the text can be manipulated, stored and/or printed through techniques known in the art.

Assume now that the user desires to scan a document written in French. Since the currently selected OCR package 29 (i.e., the English OCR package 29 in this example) does not correspond with the language of the document to be scanned, the selected OCR package 29 should be changed. In this regard, the user via input device 34 indicates that the selected OCR package 29 should be a French OCR package 29. In response, the OCR utility 27 updates the registry 28 such that the registry 28 now indicates that another set of OCR parameter values is labeled as current, as shown by blocks 71 and 88. In particular, the registry 29 is updated such that a set of OCR parameter values defining the location of a French OCR package 29 are indicated as current.

Once the registry 28 is updated, the OCR utility 27 transmits an update message to the scanning application 24 in block 91 to update the current OCR parameter values (i.e., to change the OCR package 29 used to analyze and interpret images). In response, the scanning application 24 in blocks 61 and 65 retrieves the OCR parameter values indicated by the registry 28 as current and stores these values in memory 31 as the current OCR parameter values. In the example described hereinabove, these OCR parameter values indicate the location in memory 31 of the French OCR package 29.

Next, after the user indicates that the French document is ready to be scanned and a scan message is detected by the scanning application 24, the scanning application 24 instructs the scanning device 25 to capture an image of the document, as depicted by block 74. Then, the scanning application 24 in block 76 retrieves the current OCR parameter values stored in memory 31 (i.e., the OCR parameter values defining the location in memory 31 of the French OCR package 29 in the example described hereinbefore), and the code located at the location in memory 31 defined by these OCR parameter values is executed, as shown by block 79. The execution of this code results in an analysis and interpretation of the text of the scanned document. Once the text is interpreted, it can be defined in data and manipulated, stored, and/or printed through conventional techniques.

As a result, different OCR packages 29 can be utilized to scan and interpret documents without rebooting the system 30 or reinstalling the scanning application 24 along with a new OCR package 29. In other words, a user can dynamically change which OCR package 29 is used to scan a document, thereby increasing the efficiency of the system 30.

It should be noted that it is not necessary for the user to request a change to the current OCR package 29 used by the system 20. In this regard, it is possible for a user to merely specify that a document is ready to be scanned and the language of the document. The OCR utility 27 can then determine whether the currently selected OCR package 29 is suitable for analyzing the document. If the currently selected OCR package 29 is suitable, then the scanning application 24 may begin the aforementioned scanning operation. However, if the currently selected OCR package is not suitable, then the selection of the current OCR package 29 is changed according to the techniques described hereinabove.

CODE

The following is an example of code that may be used to implement a portion of the functionality of the scanning application 24. In this regard, the following code gives the scanning application 24 the capability of detecting a notification to update which OCR package 2 is currently selected and of updating the current OCR parameter values stored in memory 31 in response to the notification.

```
LRESULT CMainFrame::OnOCRUpdate(WPARAM wParam,
LPARAM lParam)
{
    // Load Strategy Settings
    HKEY regkey;
    LONG retcode = RegOpenKeyEx (HKEY_LOCAL_MACHINE,
        "Software\\Hewlett-Packard\\ScanJet\\1ST\\1.1\\",0,
        KEY_QUERY_VALUE,&regkey);
    If(retcode == ERROR_SUCCESS)
    {
        ESTRATEGY Strategy;
        char OCRPath[500];
        DWORD Size = sizeof (OCRPath);
        If (RegQueryValueEx (regkey, "OCR Path", NULL, NULL,
            (UINT8*) OCRPath, &Size) == ERROR_SUCCESS)
        {
            REAL_FILE *pOCRFile = new REAL_FILE;
            {
                pOCRFile->SetName (OCRPath);
            }}}}
```

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims.

Now, therefore, the following is claimed:

1. An optical character recognition (OCR) system for electronically scanning text of documents into memory, comprising:
   a memory device;
   a registry configured to store parameter values that indicate locations in said memory device where OCR packages are stored, said registry configured to indicate which of said parameter values correspond with a currently selected OCR package;
   a scanning application having a set of parameter values defining a location in said memory device and configured to receive a scan message and an update message, said scanning application configured to retrieve said set of parameter values in response to a scan message if said scan message is received before said update message, said scanning application further configured to retrieve a new set of parameter values from said registry in response to said update message and to store said new set of parameter values in said memory device, said scanning application further configured to retrieve said new set of parameter values from said memory device in response to said scan message if said scan message is received after said update message, said scanning application further configured to transmit a scan command in response to said scan message;
   a processor configured to execute code located at a memory address defined by said set of parameter values that is retrieved by said scanning application in response to said scan message; and
   a scanning device configured to capture an image of a document in response to said scan command.

2. The system of claim 1, further comprising:
   an input device configured to receive a request from a user to scan a document and to transmit said scan message in response to said request.

3. The system of claim 2, further comprising an OCR utility configured to receive a request from said user to select a new OCR package, said OCR utility further configured to change which of said values are indicated by said registry as corresponding with said currently selected OCR package in response to said request and to transmit said update message to said scanning application after changing which of said values are indicated by said registry as corresponding with said currently selected OCR package.

4. The system of claim 2, further comprising an OCR utility configured to determine whether said currently selected OCR package corresponds with said document and to change which of said values are indicated by said registry as corresponding with said currently selected OCR package in response to a determination that said document fails to correspond with said currently selected OCR package, said OCR utility further configured to transmit said update message to said scanning application after changing which of said values are indicated by said registry as corresponding with said currently selected OCR package, whereby changing which of said values that correspond with said currently selected OCR package changes which of said OCR packages is currently selected.

5. The system of claim 1, wherein the processor executes the OCR package to generate a representation of the scanned document.

6. The system of claim 5, wherein the processor executes logic associated with a plurality of OCR packages without reinitializing the scanner application.

7. The system of claim 5, wherein the representation is responsive to text.

8. The system of claim 7, wherein the representation is in ASCII format.

9. The system of claim 1, wherein the scanning application is configured to retrieve OCR parameter values from the registry upon initialization of the scanning application.

10. The system of claim 9, wherein the retrieved OCR parameter values are stored in the memory device.

11. The system of claim 1, wherein the scanning application is configured to update the registry upon detecting a user request to update the OCR parameter values.

12. The system of claim 1, wherein the registry indicates a currently selected OCR package with a pointer.

* * * * *